Feb. 24, 1953
C. K. GRIEDER
2,629,220
POWER-OPERATED CLIPPING DEVICE
Filed Dec. 30, 1947
3 Sheets-Sheet 1
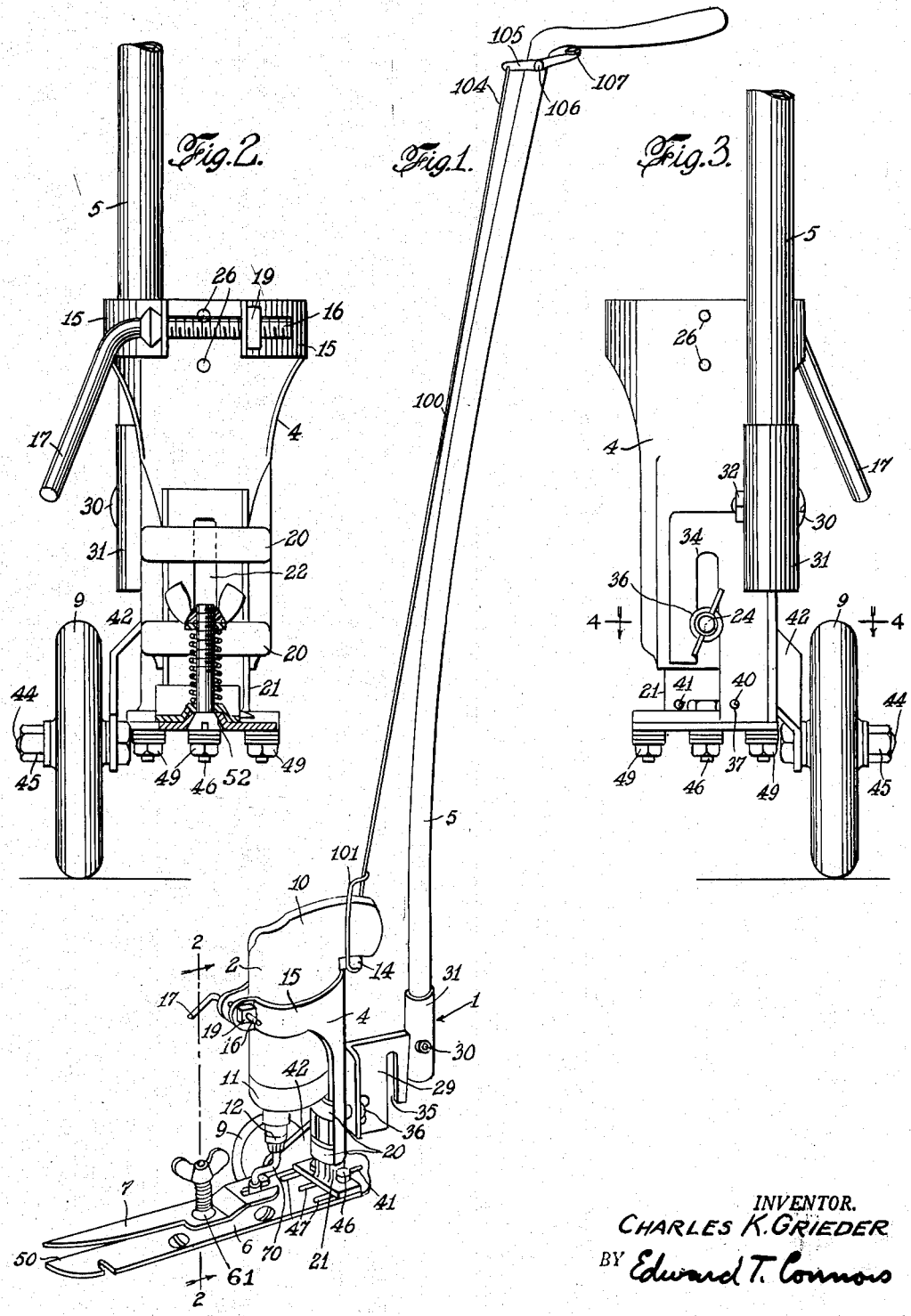
INVENTOR.
CHARLES K. GRIEDER
BY Edward T. Connors
ATTORNEY.

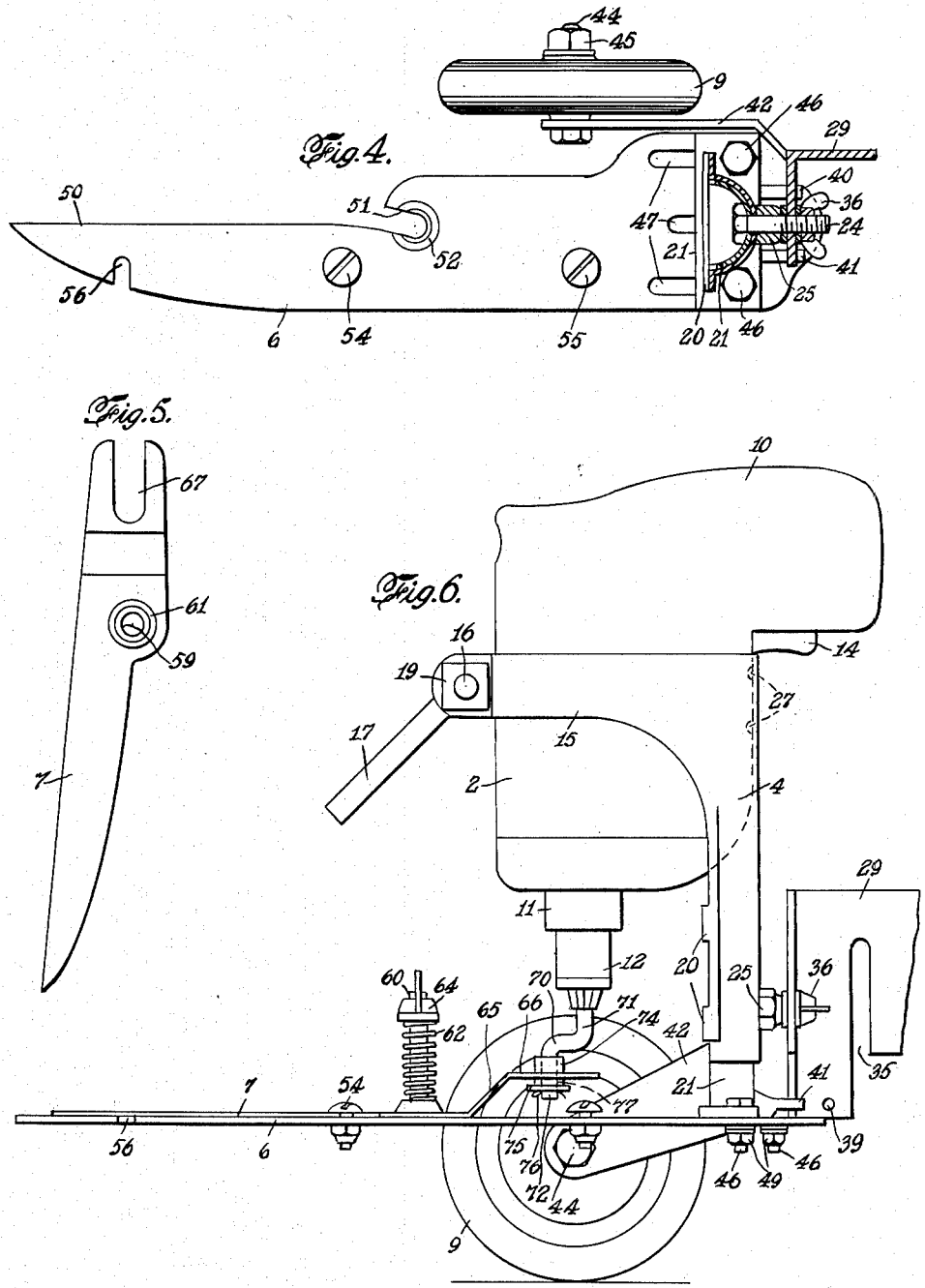

Feb. 24, 1953 C. K. GRIEDER 2,629,220
POWER-OPERATED CLIPPING DEVICE
Filed Dec. 30, 1947 3 Sheets-Sheet 3
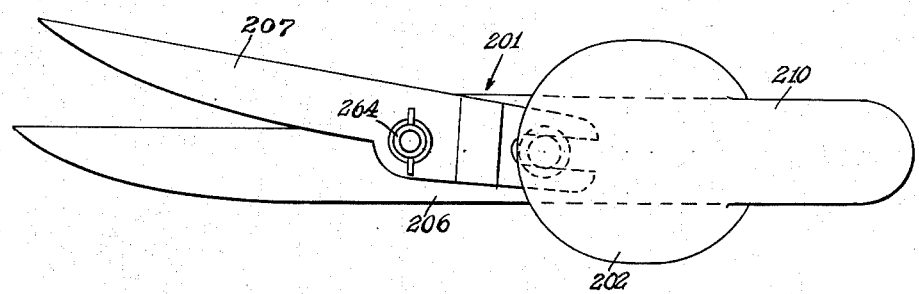
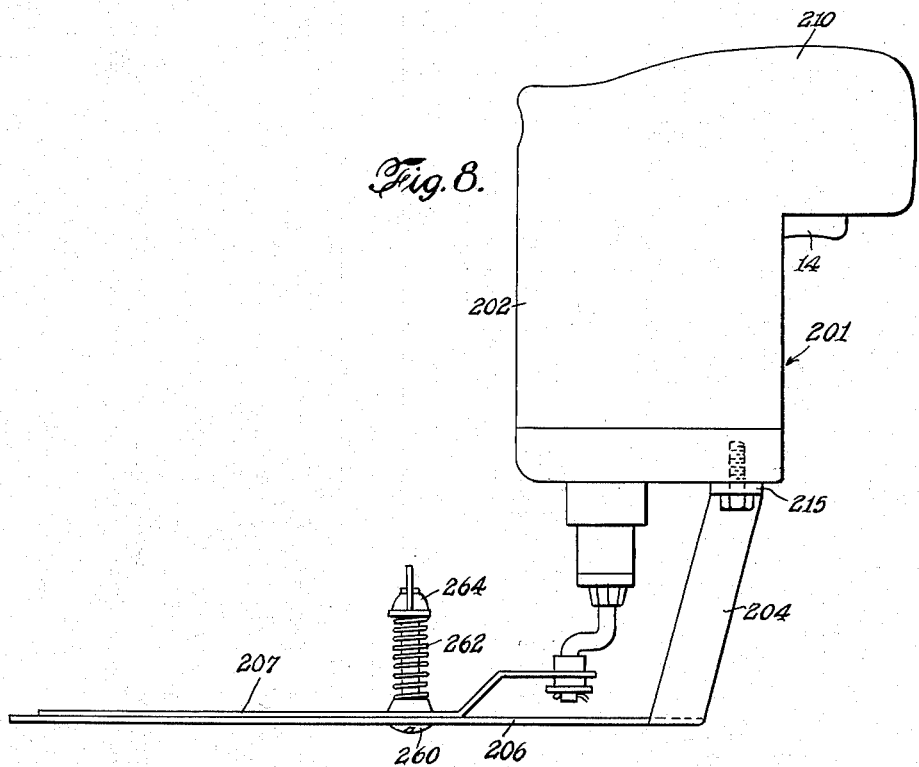
INVENTOR.
CHARLES K. GRIEDER
BY Edward T. Connors
ATTORNEY Patented Feb. 24, 1953

2,629,220

UNITED STATES PATENT OFFICE 2,629,220

POWER-OPERATED CLIPPING DEVICE

Charles K. Grieder, Bangor, Pa.

Application December 30, 1947, Serial No. 794,660

3 Claims. (Cl. 56—26.5)

This invention relates to cutting devices and more particularly to an attachment to be used with a motor for cutting grass, hedges or the like.

Heretofore, power driven devices have been provided for use in gardening but, because of the complicated construction, have been expensive to produce and, accordingly, have been difficult to sell. Further, in many cases, such devices have been of a complicated nature and easily get out of order or are broken, especially when small pebbles, sticks or the like are accidentally caught between the cutting edges during the use thereof.

The present invention aims to overcome the difficulties and disadvantages of prior devices by providing a tool for use in gardening which is inexpensive in construction.

Another object of the invention is to provide a grass cutting device adapted to be used with a portable power unit.

Another object of the invention is to provide a power driven cutting device adapted to use as its power unit a portable electric motor drill assembly of the usual type now on sale in large quantities.

Another object of the invention is to provide an attachment for a portable electric drill forming a scissors-type grass cutter.

A device in accordance with the invention is advantageous in that the major parts thereof may be stamped from sheet metal and thus the fabrication of the material may be accomplished by unskilled labor. By reason of its construction a substitution of the parts thereof may be made to produce cutters of different types so that the device may be used for a plurality of purposes.

Other objects of the invention will be apparent from the following description and from the accompanying drawings which show, by way of example, an embodiment of the invention.

In the drawings:

Fig. 1 shows a perspective view on a reduced scale of a device in accordance with the invention.

Fig. 2 is an enlarged cross-sectional view of the device taken along the line 2—2 of Fig. 1.

Fig. 3 is an enlarged rear view of the device.

Fig. 4 is a horizontal sectional view of the device taken along the line 4—4 of Fig. 3 with one cutter blade removed.

Fig. 5 is an enlarged top view of one form of cutter blade shown in position in Fig. 1.

Fig. 6 is an enlarged side view of the device shown on Fig. 1 with the handle broken away.

Fig. 7 is a top view of a modified form of the device in accordance with the invention.

Fig. 8 is a side view of the device shown in Fig. 7.

Referring to the drawings, there is shown in Fig. 1 a cutting device 1, in accordance with the invention. The device comprises a power driven electric drill unit 2, a frame 4, a guiding handle 5, an extension 6 of the frame 4, a cutting blade 7 pivotally carried by the extension 6 and a supporting wheel 9.

The motor unit 2 may be the usual electric drill assembly having a pistol grip handle 10, a gear reduction assembly positioned within the housing and indicated at 11, and a chuck 12. The motor is started and stopped by a trigger-type electric switch 14. The drill has an electric cord, not shown, adapted to be connected to a source of electric supply. The motor is started and stopped by moving the trigger switch 14, and, by reason of the gear reduction unit 11, the chuck 12 is operated at a low speed as compared with the speed of the motor.

Supporting means for the motor assembly in the frame 4 is provided by horizontal strap-like extensions 15 having apertured outer ends to receive a bolt 16 with a handle extension 17. The lower end of the bolt 16 is preferably threaded to engage in a nut 19 which, for facility of assembly, and to prevent the loss thereof, may be attached to one of the extensions 15 by welding or other suitable attaching means. The lower end of the frame 4 preferably is channeled to add to the rigidity thereof, the opened end of the channeled portion being closed by straps 20 which are welded in place.

Adjusting means to adapt the length of the frame 4 to motors having various lengths is provided by a channeled member 21 adapted to be received within the channeled end of the frame 4. The extension member 21 is formed with a slot 22 to receive a bolt 24, the bolt being positioned in an aperture extending through the back of the channeled frame 4. The extension member 21 may be variably positioned with respect to the frame 4 and secured in position by the bolt 24 and a lock nut 25.

In order to assist in the positioning of the motor unit 2 within the frame 4, inwardly extending projections 26 are made in the rear of the upper end of the frame 4 to engage in recesses 27 of the motor housing. In the event the frame is sold separately from the motor, the apertures or recesses 27 may be formed in the frame at the desired locations of the projections 26 and the frame used as a mandrel during the initial drilling of the recesses 27 in the motor housing. The apertures may then be closed by inserting the projections 26, which may be rivets or self-threading screws. In this manner the positioning of the motor unit may be made in an accurate manner.

The handle 5, at its lower end, has an L-shaped extension 29 secured to the handle in any suitable manner, such as by a bolt 30 extending through a tubular end 31 of the extension 29 and secured by a nut 32, or, if the handle is made of metal, by welding the extension 29 thereto. The L-shaped extension member 29 has vertically extending slots 34 and 35 adapted to receive the end of bolt 24 so as to position the handle in either of two positions with respect to the frame 4, a wing nut 36 being provided to secure the handle to the frame. Apertures 37 and 39 are formed in the lower edge of the L-shaped member 29 to respectively receive one of the projections 40 or 41 to assist in maintaining a rigid connection of the handle 5 with respect to the frame 4. Rolling supporting means for the unit is formed of an extension 42 of the L-shaped member 29 carrying at its outer end a shaft 44 rotatably supporting the wheel 9, the wheel being secured on the shaft by a lock nut 45.

In order to provide for motor units of various dimensions, the extension 6 is secured to the channeled member 21 and is adjustably received in the frame 4 by bolts 46 engaging in longitudinally extending slots 47 of the extension. The bolts are secured in position by lock nuts 49. The extension 6 has a cutting edge 50 on one side thereof and at the base of the cutting edge is a slot 51 with its inner end projecting or raised as indicated at 52 for a purpose to be later described. The extension 6 is provided with lock bolts 54 and 55 threadedly engaged in the blades so that the heads of the lock bolts extend upwardly from the blade surface at a predetermined distance, and the extension is slotted as indicated at 56 to receive another blade attachment which will be later described.

In accordance with the invention a cutter blade 7 is provided to coact with the cutting edge 50 of the extension 6. The blade 7 is apertured at 59 to receive a flat-headed bolt 60 which is removably received in the slot 51 of the extension 6. An upwardly extending portion 61 is formed about the aperture 59 of the blade 7 of a shape to form a recess on the underside of the blade for engagement by the upper projecting or raised portion 52 of the extension 6. A spring 62 is positioned about the bolt 60 and secured in position by a wing nut 64. The blade 7 with the bolt 60, the wing nut 64 and the spring 62 in position may be readily detached from the extension 6 by depressing the bolt 60 downwardly, compressing the spring and allowing the cutting blade 7 to be removed. The assembly may be replaceably positioned in pivotal engagement with the extension 6 by reversing this procedure. The spring 62 not only serves to resiliently hold the cutter blade 7 in place on the extension 6, but also provides resilient means for allowing a separation of the blades when a stone or other foreign matter is caught therebetween, thus preventing breakage of the parts of the device. The inner end of the blade 7 is bent upwardly as indicated at 65 and thence back horizontally to form an inner end 66 made with a slot 67.

The oscillation of the cutter blade 7 by the motor unit 2 is accomplished by the use of a crank pin 70 having its upper end 71 adapted to be received in the opening of the chuck 12. The lower end 72 of the crank pin 70 is fitted with a bushing 74 which may be held on the crank pin 72 by a washer 75 and a lock pin 76 in an aperture 77 in the lower end of the crank pin, or by peening over the end of the crank pin. The bushing 74 is adapted to be received in the slot 67 of the cutter blade 7.

Actuating means for the switch 14 are provided by a rod 100 having a looped lower end 101 adapted to extend around the pistol grip 10 and the trigger switch 14. The upper end 104 is secured in the apertured end of a member 105 pivotally secured to the end of the handle 5 by a bolt 106. A thumb engaging surface 107 is provided at the other end of the pivoted member 105 for ease in the manipulation of the rod 100 to hold the trigger switch 14 in the "on" position.

In Figs. 7 and 8, another embodiment of the invention is illustrated in which corresponding parts are designated by the same reference numbers as in Figs. 1 through 6 with the addition of 200. This embodiment differs principally from that previously described in that it is adapted for use with a power unit of predetermined length and no means are provided for varying the position of the extension 6 with respect to the main frame 4. In Fig. 7, there is a top view of a cutting device 201 having a frame 204 with an extension 206 at the lower end thereof carrying a cutter blade 207 pivotally supported by a bolt 260 extending from an aperture in the member 206. The blade 207 is resiliently held against the extension 206 by a spring 262 secured by a lock nut 264. This form of the device is advantageous in that the frame 204 with its motor mounting means 215 and its extension 206 may be made in one piece as a single stamping.

It is thus apparent that an electric grass and hedge cutter has been provided of an improved and economical construction which may be readily fabricated by the use of unskilled labor.

While the invention has been described and illustrated with reference to a specific embodiment thereof, it will be understood that other embodiments may be resorted to without departing from the invention. For example, while the power unit is shown as an electric motor, it might be substituted for by a small gasoline motor or the like. Although the parts of the device have been described as being assembled, in some instances, by the use of bolts and nuts, it is understood that other suitable attaching means may be utilized, such as riveted or welded constructions. And, further, the embodiment shown in Figs. 7 and 8 might also be provided with a handle, or a wheel support, or with both as illustrated in connection with the embodiment shown in Figs. 1-6. Therefore, the form of the invention set out above should be considered as illustrative and not as limiting the scope of the following claims.

I claim:

1. A power actuated edge trimmer comprising a frame, motor mounting means on the frame, a stationary shear blade extending from one side of the frame, a movable shear blade to coact with the stationary shear blade, pivot means adapted to support the movable blade with respect to the stationary for shearing action therewith, supporting means for the trimmer to hold the blades above a surface, and resilient means to urge the blades together, the pivot means including a projecting portion on one blade and a cooperating recess on the other blade to provide a bearing surface, the resilient means permitting a spacing of the blades greater than the distance the projecting portion extends into the recess, whereby the blades may be spread by a foreign object for its passing without damage to the blades.

2. A power actuated edge trimmer comprising a frame, motor mounting means on the frame, a stationary shear blade extending from one side of the frame, a movable shear blade to coact with the stationary shear blade, pivot means adapted to support the movable blade with respect to the stationary for shearing action therewith, supporting means for the trimmer to hold the blades above a surface, and resilient means to urge the blades together, the pivot means including a projecting portion on one blade and a cooperating recess on the other blade to provide a bearing surface, the contacting surface of the projecting portion and of the recess being shaped so that the outer end of the projecting portion is appreciably smaller than the opening of the recess so that upon a spacing of the blades a return to normal position is facilitated, the resilient means permitting a spacing of the blades greater than the distance the projecting portion extends into the recess, whereby the blades may be spread by a foreign object for its passing without damage to the blades.

3. A power actuated edge trimmer comprising a frame, motor mounting means on the frame, a stationary shear blade extending from one side of the frame, a movable shear blade to coact with the stationary shear blade, pivot means adapted to support the movable blade with respect to the stationary for shearing action therewith, supporting means for the trimmer to hold the blades above a surface, and resilient means to urge the blades together, the pivot means including a projecting portion on one blade and a cooperating recess on the other blade to provide a bearing surface, the contacting surface of the projecting portion and of the recess being shaped so that the outer end of the projecting portion is appreciably smaller than the opening of the recess so that upon a spacing of the blades a return to normal position is facilitated, the resilient means permitting a spacing of the blades greater than the distance the projecting portion extends into the recess, one of the blades slotted at its bearing surface to permit the easy separation of the blades, whereby the blades may be spread by a foreign object for its passing without damage to the blades.

CHARLES K. GRIEDER.

REFERENCES CITED

The following references are of record in the file of this patent:

UNITED STATES PATENTS

| Number | Name | Date |
| --- | --- | --- |
| 740,489 | Thrasher | Oct. 6, 1903 |
| 935,225 | Person et al. | Sept. 28, 1909 |
| 1,445,515 | Jones et al. | Feb. 13, 1923 |
| 1,882,218 | Harvey | Oct. 11, 1932 |
| 1,902,114 | Beanblossom | Mar. 21, 1933 |
| 2,286,552 | Klose | June 16, 1942 |
| 2,351,460 | Shelton | June 13, 1944 |
| 2,458,200 | Renfroe et al. | Jan. 4, 1949 |
| 2,521,293 | Hunt et al. | Sept. 5, 1950 |